United States Patent Office 3,415,517
Patented Dec. 10, 1968

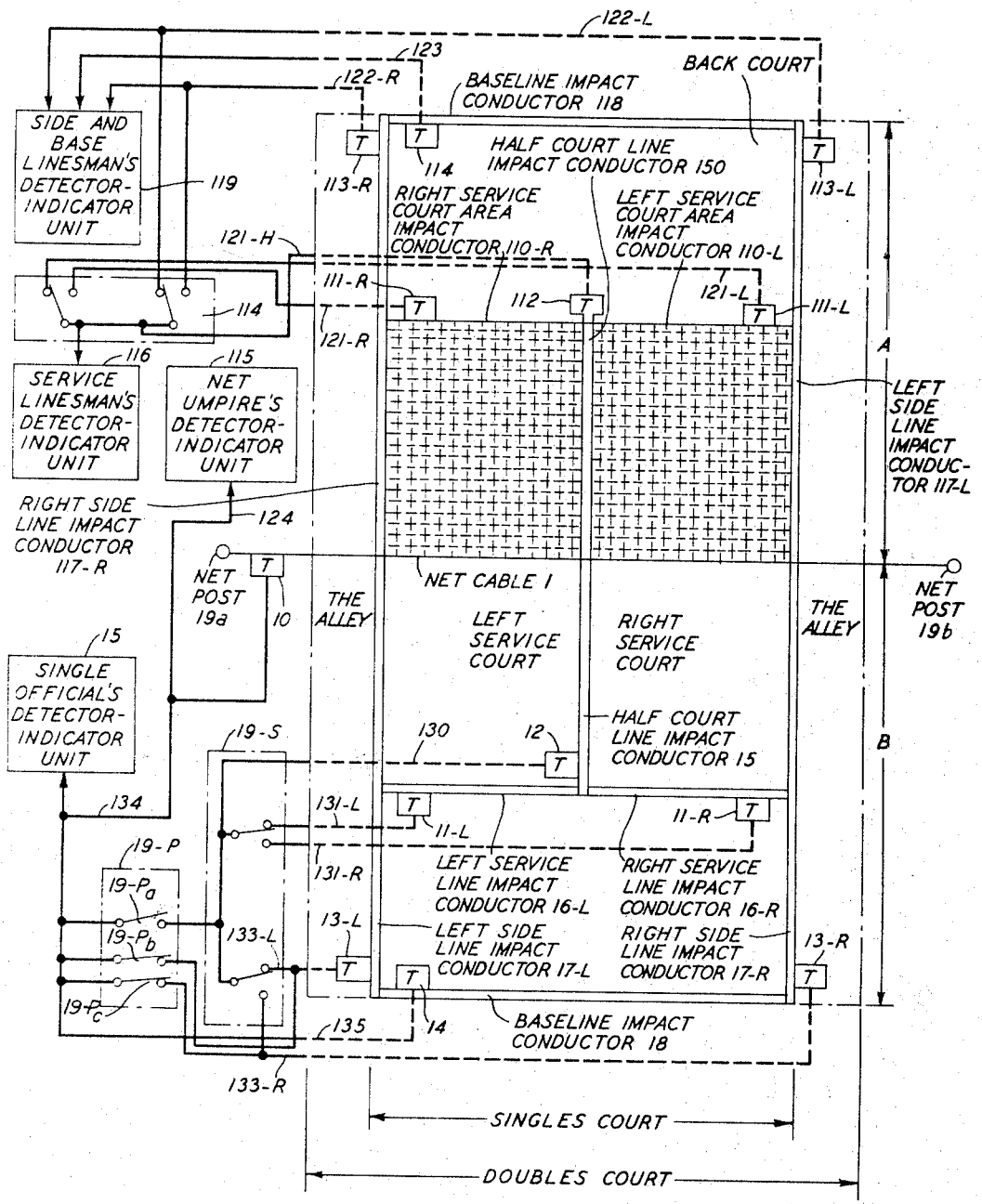

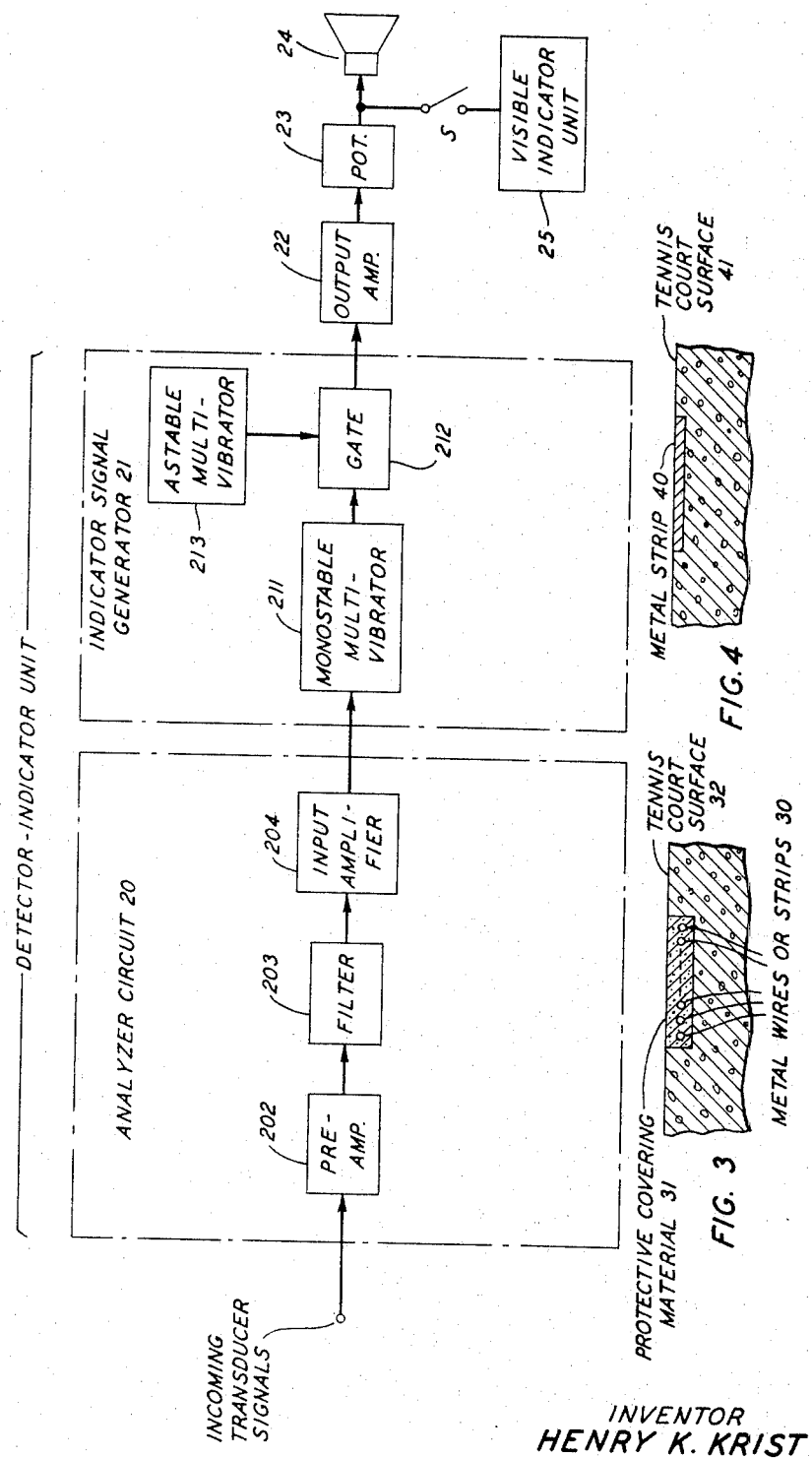

3,415,517
AUTOMATIC IMPACT INDICATOR SYSTEM
FOR TENNIS
Henry Kelvin Krist, De Camp Drive, R.D. 1,
Boonton, N.J. 07005
Filed Oct. 18, 1965, Ser. No. 497,406
14 Claims. (Cl. 273—31)

ABSTRACT OF THE DISCLOSURE

An automatic impact detector and indicator system is disclosed to assist in the umpiring of tennis matches. The system utilizes impact conductor devices which define selected boundaries and areas of a tennis court. Transducers are connected to the conductor devices for converting an impact on a conductor into a signal which operates an indicator-detector to aid an umpire in judging a match. Impact devices and transducers are also associated with the tennis net for detecting and indicating impacts thereon.

---

This invention relates to automatic impact indicator systems, and in particular to an automatic impact indicator system for tennis matches.

Tennis matches are generally played on a rectangular court of fixed dimensions divided across the middle by a net, and umpiring of a match ordinarily requires a number of officials stationed at various points around the court in order to observe whether a ball is properly served and played. It is recognized, however, that making proper decisions requires constant alertness and keen vision, and that even skilled officials can err occasionally, especially in making close decisions in important championship matches. For example, see pages 27 and 28 of the "Umpire's Manual" issued by the United States Lawn Tennis Association. In addition to the possibility of human error, in many cases the high velocity of the ball and the awkward position of the official relative to the ball, the net, or the boundary lines of the court make it virtually impossible to observe whether or not a ball has been properly served and played.

The present invention provides an automatic impact indicator system to assist in the umpiring of tennis matches, in which impacts on portions of the court or net which affect the scoring of the game are detected automatically. By eliminating dependence on human observation, accurate, consistent standards for detecting these impacts are provided under all circumstances, thereby avoiding human errors and controversial decisions.

In the automatic system provided by the present invention, the significant boundaries and areas of a tennis court and net are defined by impact conducting devices, also referred to hereinafter as impact conductors, so that the impact of a ball or of a player's body or racket on an impact conductor will be transmitted through the conductor. Attached to each impact conductor is a transducer for converting any impact on a conductor into a corresponding electrical signal which is delivered to a detector-indicator unit. An umpiring official is provided with a detector-indicator unit connected to the transducers at the boundaries for which he is responsible, and each detector-indicator unit analyzes an incoming transducer signal on the basis of objective, measurable criteria to determine whether or not a significant impact has occurred due to the impact on the corresponding impact conductor of a ball, a part of a player's body, or his racket. If it is determined by the detector-indicator unit that the transducer signal was caused by a significant impact, then a visible or audible indication is provided by the detector-indicator unit for the benefit of the appropriate official. As defined in this invention, an impact is considered to be significant if the corresponding electrical signal lies within a predetermined frequency range and exceeds a preselected threshold.

An important feature of this invention is the provision of an impact conducting device for an entire surface area of a selected portion of a tennis court, rather than impact conductors that define only the boundaries of a portion of the court. In this way a scoring impact anywhere within a selected portion of a court, for example, within one of the service courts, will be indicated to the official responsible for umpiring the play within that portion of the court. Such area impact conducting devices may be used independently of or in conjunction with boundary impact conducting devices, as desired.

An additional feature of this invention is the provision of a foot or hand operated switch to disconnect one or more transducers from a detector-indicator unit in order to prevent unnecessary signals from being communicated to the detector-indicator unit and thereby distracting and possibly confusing the responsible official. Thus during delivery of the service one set of impact conductors and associated transducers is required for umpiring the service, while after delivery of the service, another set of impact conductors and associated transducers is required for umpiring the subsequent play of the ball. Also, the provision of this switch enables a match to be umpired by a single official, thereby reducing the number of officials required and avoiding the possibility of conflicting decisions by different officials.

A further feature of this invention is the speed with which transducer signals are analyzed and an appropriate visible of audible indication is provided to the official. As a result, faults are immediately detected, and umpiring of a match is facilitated.

The invention will be fully understood from the following detailed description of illustrative embodiments thereof taken in connection with the appended drawings, in which:

FIG. 1 is a plan view of a tennis court incorporating a complete automatic impact indicator system embodying the principles of this invention;

FIG. 2 is a schematic block diagram illustrating in detail certain components of the system shown in FIG. 1;

FIG. 3 is a cross-section view of a boundary impact conductor which may be employed in the system shown in FIG. 1; and FIG. 4 is a cross-section view of an alternative boundary impact conductor which may be employed in the system shown in FIG. 1.

Referring first to FIG. 1, this drawing illustrates a complete automatic impact indicating system for umpiring tennis matches, in which for convenience of description different features of the system are shown in the portions of a tennis court designated "A" and "B." Within the "A" portion of the court, two different types of impact conductors are shown, so-called area impact conductors 110–R and 110–L respectively positioned to define the right and left service courts in "A," and so-called boundary impact conductors 150, 118, 117–R, and 117–L respectively positioned to define the half court line, baseline, and right and left sidelines in "A." Within the "B" portion of the court, on the other hand, only boundary impact conductors are shown in order to illustrate that boundary impact conductors may be used alone in practicing the principles of this invention. Although the following description will be in terms of matches played on the singles court shown in FIG. 1, it will be apparent to those skilled in the art that the principles of this invention may be applied to matches played on the doubles court shown in FIG. 1, with appropriate modification of the apparatus details.

Area impact conductors 110-R and 110-L may be constructed of wire, plastic, or glass fibre mesh or screen embedded in or just below the surface of the court and of sufficient size to define separately the right and left service courts in "A," exclusive of the half court line and side line boundaries of the service courts. Boundary impact conductors 150, 118, 117-R, and 117-L may be of the construction shown in either FIG. 3 or FIG. 4, and may be embedded flush with or just below the surface of the court to define the half court line, baseline, and right and left sidelines, respectively, in the "A" portion of the court.

As illustrated in FIG. 3, a boundary impact conductor may comprise a plurality of metal or plastic wires or strips 30, for instance, wires or strips of steel, covered by a suitable protective material 31 such as asbestos, canvas, plastic or glass fibre. The entire impact conductor is embedded in the court, preferably with the top surface of the conductor flush with the surface 32 of the court, although if desired, the conductor may be embedded just below the surface of the court. In the case of clay surface courts, it may be desired for the top surface of the impact conductor to be flush with the surface of the court, as shown in FIG. 3, in which case the covering material 31 should be designed not only to convey an impact to the interior wires or strips but also to provide a good, uniform, durable rebound surface for a tennis ball. By way of example, a suitable covering material meeting the requirements for this application is asbestos. The interior wires or strips 30 run the entire length of the boundary defined by the impact conductor, and if desired, the wires or strips may be under tension to ensure that an impact at one point on the covering material is carried through the wires or strips for the entire length of the impact conductor.

FIG. 4 illustrates an alternative boundary impact conductor comprising an uncovered metal strip 40 embedded in the surface 41 of the court with its top surface flush with the court surface. This construction may be preferred for installation of the system of this invention in tennis courts having a cement, asphalt or other hard surface material.

Returning to the "A" portion of the court in FIG. 1, attached to each area impact conductor 110-R and 110-L is a transducer 111-R and 111-L, respectively, where transducers 111-R and 111-L may be conventional contact microphones, for example, of the piezoelectric crystal variety. The transducers are attached to the corresponding impact conductors in any suitable fashion so that an impact on a conductor will be conveyed to the corresponding transducer to cause the transducer to produce an electrical signal. Transducers 111-R and 111-L are respectively connected by means of suitable signal paths 121-R and 121-L to service linesman's detector-indicator unit 116 via switch 114, the dashed portion of the signal paths 121-R and 121-L between each transducer and switch 114 indicating that a part of each of the signal paths may be buried under the surface of the court to avoid obstructions that might interfere with the players. The construction of unit 116 is shown in detail in FIG. 2 and described below.

Attached to each boundary impact conductor 150, 118, 117-R, and 117-L is a respective transducer 112, 114, 113-R, and 113-L, where these transducers may be of the same construction as transducers 111-R and 111-L. Transducers 114, 113-R, and 113-L are connected via respective signal paths 123, 122-R, and 122-L to side and base linesman's detector-indicator unit 119, unit 119 being of similar design to unit 116. Transducer 112 is connected to unit 116 through switch 114 via path 121-H, and transducers 113-R and 113-L are connected to unit 116, in addition to unit 119, via switch 114.

Area impact conductors 110-R and 110-L respectively cover the right and left service courts in the "A" portion of the court, extending to and including that portion of each service court known as the right and left service court lines. However, area impact conductors 110-R and 110-L do not include the half court line or the right and left side lines of the singles court, since the half court line is used in umpiring serves to both right and left service courts, and the right and left sideline boundaries are used in umpiring both service and subsequent play, hence these boundaries must be defined separately from the service court areas. During the service from the player in the "B" portion of the court to the player in the "A" portion of the court, a served ball must strike either the area within the proper one of the service courts defined by the area impact conductors in the "A" portion of the court, or on one of the half court or sideline boundary impact conductors, in order to avoid losing a point for the server. See Rule 8(b) of the "Rules of Lawn Tennis" cited above. It is to be understood, of course, that lets and foot faults must also be avoided during the service, and detection of these will be explained later.

Unit 116 assists the service linesman, that is, the official responsible for deciding whether a served ball strikes the ground within the proper service court in "A," in the following manner. For example, if the player in "B" is serving to the right service court in "A," the service linesman sets either by foot or by hand the contacts of switch 114 so that transducers 113-R and 111-R are connected to unit 116, transducer 112 being permanently connected to unit 116 since the half court line impact conductor 150 defines a boundary common to both service courts. Conductor 150 is therefore used to assist in umpiring a service regardless of the service court to which the serve is to be delivered. If the served ball strikes the ground properly in the "A" portion of the court, then the impact on one of the impact conductors defining the right service court causes an electrical signal to be generated by the corresponding transducer and delivered to unit 116. Specifically, if the served ball strikes the area defined by impact conductor 110-R or the boundaries defined by impact conductors 117-R or 150, this causes an electrical signal to be generated by the corresponding transducer 111-R, 113-R, 112. It is to be understood that a ball may simultaneously strike two contiguous impact conductors, thereby causing two electrical signals to be generated by the corresponding transducers, but this will not adversely affect the operation of unit 116.

The transducer signal generated as a result of any displacement of or impact upon an associated impact conductor is analyzed by unit 116 to determine whether the transducer signal was caused by the impact of a ball, so that if, as in the example given above, the transducer signal was generated by such an impact, unit 116 provides for the service linesman an indication detectable by human senses, for example, a visible or audible indication, or both, of the impact within the proper service court. On the other hand, if the service is a fault in that the served ball strikes anywhere else on the "A" side of the court than the proper service court, for example, the area defined by area impact conductor 110-R or on the boundary impact conductors 117-R, 150, this is indicated by an absence of an indication from unit 116. Similarly, a proper service or a fault to the left service court in "A" is indicated by the presence or absence of a visible or audible signal from unit 116, assuming of course that the contacts of switch 114 have been previously set to connect transducers 113-L and 111-L to unit 116.

After a served ball is returned, the playing area for the player in "A" includes the entire singles area of the "A" portion of the court, and scoring decisions on balls striking the ground near or on the base line or right and left side lines are made by the side and base linesman with the assistance of unit 119. Thus a ball striking impact conductors 118, 117-R or 117-L, which is considered as falling within the singles court in "A" according to Rule 20 of the "Rules of Lawn Tennis," is communicated to the side and base linesman by means of a signal from the corresponding transducer which is detected, analyzed, and converted by unit 119 into a visible or audible indication, or both. Also, when the player on the "A" side of the court is the server, unit 119 assists the side and base linesman in detecting foot faults, in that if the server's foot touches the baseline during the service, impact conductor 118 and transducer 114 cooperate to communicate this touching to the linesman by means of the visible or audible indication provided by unit 119.

In addition to the service linesman and side and base linesman, a third official, a net umpire, is employed to detect service "lets." According to Rule 13(a) of the "Rules of Lawn Tennis," a service is a let "If the ball served touches the net, strap or band, and is otherwise good. . . ." The strap is located at the center of the net where it holds the net taut, while the band is at the top of the net to cover the cord or metal cable from which the net is suspended. The present invention provides for detection of lets of this kind, even those of extremely small magnitudes, that is, even the slightest touching of the net by the ball is detected by the following arrangement provided in this invention. The net is suspended from a net cable 1, preferably a metal cable under tension between net posts 19a and 19b, and to this net cable there is attached a transducer 10 of the type described above. However, it is to be understood that transducer 10 may be attached to the strap (not shown) instead of cable 1, if desired. The metal cable or strap serves as an impact conductor, so that during delivery of a service the impact of a served ball striking any portion of the net, strap or band is conducted by net cable 1 to cause an electrical signal to be produced by transducer 10, and this signal is conveyed by a suitable signal path 124 to unit 115. Unit 115, which may be identical with units 116 and 119, converts a transducer signal caused by the impact of a ball into a visible or audible indication, or both, which is communicated to the net umpire. After delivery of a service, unit 115 also assists the net umpire in detecting whether either of the players or their rackets touches the net, posts, or cable, since a player who commits such a touching while the ball is in play loses the point. See Rule 18(e) of the "Rules of Lawn Tennis."

Turning now to the "B" portion of the court in FIG. 1, this side of the court illustrates both an automatic tennis impact indicating system using only boundary impact conductors, and a system in which only a single detector-indicator unit 15 is employed to assist in umpiring a match, thereby requiring only a single official. Although the following description will be in terms of a single detector-indicator unit to assist a single official in umpiring the play on the "B" side of the court, it will be obvious to those skilled in the art that the principles of this arrangement can be extended to employ a single detector-indicator unit to assist a single official in umpiring the play on both sides of the court.

The right and left service courts on the "B" side are defined by right and left service line impact conductors 16–R, 16–L, half court line impact conductor 15, and portions of the right and left side line impact conductors 17–R, 17–L. After return of the service, the playing area is defined by side line impact conductors 17–R, 17–L and baseline impact conductor 18. Among the necessary conditions for proper service, it is required that a ball served by a player on the "A" side of the court to a player on the "B" side of the court must fall within the proper one of the service courts on the "B" side of the court defined by these impact conductors, or on one of the impact conductors defining the proper service court. Otherwise, the service is a fault. See Rules 8 and 9 of the "Rules of Lawn Tennis" cited above.

Attached to each impact conductor 16–L, 16–R, 15, 17–L, 17–R, 18 is a corresponding transducer 11–L, 11–R, 12, 13–L, 13–R, 14, where these transducers may be of the same construction as the transducers previously described above. The electrical signals developed by transducers 11–L, 11–R, 12, 13–L, 13–R, and 14 in response to an impact upon or displacement of the corresponding impact conductors are delivered by means of suitable signal paths 131–L, 131–R, 130, 133–L, 133–R, and 135, portions of these paths being shown as dashed lines to indicate that portions of the paths may be located under the surface of the court as necessary to avoid obstructions that might interfere with the players.

Unit 15 is used to assist the official umpiring the service and play on the "B" side of the court in the following manner. The official operates switch 19–P by foot or by hand to connect the appropriate output terminals of switch 19–S to the input terminal of unit 15, thereby to deliver signals from the transducers used in umpiring a service from "A" to "B." When the contacts 19–P$_a$ of switch 19–P are opened, switch 19–S is disconnected from unit 15, so that unit 15 receives signals from only those transducers used in umpiring play subsequent to service from "A" to "B" and in umpiring lets and foot faults in delivery of service from "B" to "A." In addition, the transducer 10 attached to net cable 1 is permanently connected to unit 15 in order to assist in umpiring both delivery of service from "B" to "A" and play subsequent to a service from either "A" or "B." Also, contacts 19–P$_b$ and 19–P$_c$, which are open during a service since one or the other of transducers 13–L, 13–R is connected via switch 19–S and contacts 19–P$_a$ of switch 19–P to unit 15, are closed subsequent to service so that both transducers 13–L and 13–R are connected to unit 15 to detect impacts on the boundaries of the playing area, together with transducer 14.

In the umpiring of a service, the official also sets the contacts of switch 19–S, again either by hand or by foot, or otherwise, to connect the transducers associated with the proper service court to unit 15 via switch 19–P, transducer 12 being permanently connected to the output terminal of switch 19–S since half court line impact conductor 15 defines a boundary common to both service courts and is therefore used in umpiring a serve to either service court.

Referring next to FIG. 2, this drawing illustrates in detail a detector-indicator unit of the type shown in FIG. 1. Incoming transducer signals are first applied to analyzer circuit 20 comprising a preamplifier 202, a filter 203, and an input amplifier 204, all connected in tandem. Preamplifier 202 provides the proper impedance for the incoming signal, and may be of any well known design. Filter 203 is a band-pass filter of conventional structure having a pass band extending from about 50 to 1000 c.p.s. in order to eliminate unwanted transducer signals resulting from non-significant impacts on or displacements of the impact conductors; for example, unwanted signals may result from vehicular traffic near the court or from wind moving the net. The exact limits of the pass band of filter 203 will of course depend upon a number of factors such as the materials used in constructing the impact conductors, the composition of the court in which the impact conductor is embedded, and the construction of the net cable and the tension under which it is placed.

Amplifier 204 is also of well known design and is provided with a predetermined threshold to block the passage of transducer signals that are considered to be spurious because they are too weak to result from a significant impact. Transducer signals that are passed by filter 203 and exceed the threshold of amplifier 204 are therefore judged to result from a significant impact upon one or more of the impact conductors shown in FIG. 1. By this arrangement, objective, measurable criteria are established for determining whether a ball has touched one of the boundaries of the court, a let serve has occurred, or a player's body or racket has touched the net.

Amplifier 204 is also provided with a predetermined gain constant so that an incoming transducer signal that is passed by filter 203 and exceeds the threshold of amplifier 204 is increased in amplitude. The increased amplitude signal developed by amplifier 204 is delivered to indicator signal generator 21, in order to generate an appropriate signal that will indicate a significant impact to the appropriate official. Within generator 21, the increased amplitude signal from amplifier 204 is used to trigger a conventional monostable multivibrator 211 to produce an output pulse having a predetermined duration, for example, one second. The output pulse produced by multivibrator 211 is passed to the control terminal of a transmission gate 212 of any well known variety, thereby enabling gate 212 for the duration of the output pulse from multivibrator 211. A free-running or astable multivibrator 213, or other well known source of oscillations, produces a tone signal of desired frequency which is delivered to the input terminal of gate 212 so that for the interval that gate 212 is enabled, a tone signal burst is passed by gate 212 to output amplifier 22. Amplifier 22 increases the amplitude of the tone burst signal, and the increased amplitude tone burst signal is delivered to a potentiometer 23 by means of which the tone burst signal amplitude may be adjusted by the official to a desired level. From potentiometer 23, the amplitude adjusted tone burst signal is delivered to a suitable transducer for conversion into an audible or visible signal or both. The transducer may be either a conventional loudspeaker 24 or a visible signal apparatus 25 which may take any one of a number of well known forms. Switch S enables both elements 24 and 25 to be employed if so desired.

Although this invention has been described in terms of an automatic impact indicator system for tennis matches, it is to be understood that applications of the principles of this invention are not limited to tennis matches but include other sports and games such as badminton, table tennis, bowling, and swimming, where it is necessary or desirable to determine with accuracy and reliability the impact of an object upon one or more specific boundaries or within one or more specific areas. In addition, it is to be understood that the above-described embodiments of the principles of this invention are merely illustrative of the numerous arrangements that may be devised for the principles of this invention by those skilled in the art without departing from the spirit and scope of the invention.

What is claimed is:

1. Apparatus for automatically detecting impacts to assist in umpiring a tennis match which comprises
    a plurality of *n* impact conductors positioned to define *n* selected portions of a tennis court, where *n* is a positive integer greater than zero,
    a plurality of *n* transducers each attached to a corresponding one of said *n* impact conductors, wherein each of said transducers generates a signal in response to an impact on the corresponding impact conductor, and
    a plurality of *m* detecting and indicating means each supplied with signals from associated ones of said *n* transducers, wherein each detecting and indicating means determines whether each signal from an associated transducer is caused by a significant impact on the corresponding impact conductor, and wherein each signal caused by a significant impact is converted into an indication detectable by human senses, where *m* is a positive integer greater than zero.

2. Apparatus as defined in claim 1 wherein said indication detectable by human senses is an audible indication.

3. Apparatus as defined in claim 1 wherein said indication detectable by human senses is a visible indication.

4. Apparatus for automatically detecting impacts on selected portions of a tennis court comprising a rectangle of predetermined dimensions which is divided by a net in order to assist in umpiring tennis matches played on said court, which comprises
    a plurality of impact conductors positioned to define selected boundaries of said court,
    a plurality of transducers each attached to a corresponding one of said impact conductors for generating signals in response to impacts on and displacements of corresponding impact conductors,
    a plurality of detecting and indicating means for determining whether each signal from a transducer is caused by a significant impact on or displacement of the corresponding impact conductor, wherein each signal caused by a significant impact is converted into an indication detectable by human senses, and
    means for connecting each of said plurality of transducers with selected ones of said plurality of detecting and indicating means.

5. In combination with apparatus defined in claim 4,
    a plurality of area impact conductors positioned to define selected areas of said court,
    a plurality of area transducers each attached to a corresponding one of said area impact conductors for generating signals in response to impacts on corresponding area impact conductors, and
    switching means for selectably associating said plurality of area transducers with said plurality of detecting and indicating means.

6. Apparatus as defined in claim 5 wherein each of said area impact conductors comprises
    a wire mesh embedded just below the surface of said court.

7. In combination with apparatus defined in claim 5,
    a net impact conductor positioned on said net,
    a net transducer attached to said net impact conductor for generating signals in response to impacts upon and displacements of said net impact conductor, and
    a net detecting and indicating means associated with said net transducer for determining whether each signal from said net transducer is caused by a significant impact upon or displacement of said net impact conductor, wherein each signal lying within a predetermined frequency range and exceeding a preselected threshold level is considered to be caused by a significant impact, and wherein each signal caused by a significant impact is converted into an indication detectable by human senses.

8. In a system for automatically detecting impacts on selected boundaries of a tennis court to assist in umpiring tennis macthes, boundary impact conductors embedded in the surface of said court to define said selected boundaries of said tennis court which comprise
    a plurality of impact conducting strips,
    a covering material surrounding said strips and having at least one surface that is flush with the surface of said court,
    and means connected to said strips to convert impacts on said covering material into a humanly detectable signal.

9. Boundary impact conductors as defined in claim 8 wherein said impact conducting strips are constructed of a metallic substance.

10. Boundary impact conductors as defined in claim 8 wherein said covering material is asbestos.

11. Apparatus for automatically detecting impacts on the net that divides a tennis court in order to assist in umpiring tennis matches, which comprises
    a cable suspended under tension between a pair of net posts to support said net,
    a transducer attached to a selected point on said cable for generating signals in response to impacts upon and displacements of said net, and
    a detecting and indicating means supplied with signals from said transducer for determining whether each signal from said transducer is caused by a significant impact upon or displacement of said net, wherein each signal lying within a predetermined frequency range and exceeding a preselected threshold level is considered to be caused by a significant impact, and wherein each signal caused by a significant impact is converted into an indication detectable by human senses.

12. Apparatus as defined in claim 11 wherein said transducer is a crystal microphone.

13. Apparatus as defined in claim 11 wherein said detecting and indicating means comprises
an analyzer circuit including
a preamplifier,
a filter having a pass band selected to pass only those transducer signals lying within a predetermined frequency range, and
an input amplifier provided with a selected gain constant and a threshold selected so that only those transducer signals passed by said filter and having a magnitude exceeding said threshold are amplified to develop a trigger signal, wherein said preamplifier, said filter and said input amplifier are connected in tandem, and
an indicator signal generator including
a monostable multivibrator responsive to a trigger signal from said input amplifier for producing an output pulse of predetermined duration,
a source of a tone signal of predetermined frequency,
a transmission gate provided with a control terminal, an input terminal, and an output terminal,
means for delivering said output pulse from said monostable multivibrator to said control terminal of said gate, thereby to enable said gate for the duration of said output pulse,
means for delivering said tone signal to the input terminal of said gate so that a tone signal burst is passed to said output terminal of said gate during the time that said gate is enabled,
output amplifier means for increasing the magnitude of said tone signal burst,
means for adjusting said increased magnitude tone signal burst to a desired level, and
means for converting said magnitude adjusted tone signal burst into said indication detectable by human senses.

14. Apparatus for automatically detecting impacts to assist in umpiring a tennis match which comprises
a plurality of impact conductors positioned to define selected portions of a tennis court including net, right and left side lines, right and left service lines, half court line and base line,
a plurality of transducers each attached to a corresponding one of said impact conductors, wherein each of said transducers generates a signal in response to an impact on the corresponding impact conductor,
detecting and indicating means supplied with said signals for determining whether each signal is caused by a significant impact on the corresponding impact conductor, wherein each signal caused by a significant impact is converted into an audible and a visible indication, and
switching means for delivering signals generated by selected ones of said transducers to said detecting and indicating means, said switching including a first plurality of sets of contacts for connecting selected ones of said transducers to said detecting and indicating means during service, and a second plurality of corresponding sets of contacts for connecting selected ones of said transducers to said detecting and indicating means during play subsequent to service.

References Cited

UNITED STATES PATENTS

| | | | |
|---|---|---|---|
| 2,276,837 | 3/1942 | Greentree et al. | 340—38 |
| 2,695,173 | 11/1954 | Sterne | 273—102.2 |
| 3,041,588 | 6/1962 | Malin | 340—384 |
| 3,134,970 | 5/1964 | Kelly et al. | 340—261 |
| 3,147,467 | 9/1964 | Laakmann | 340—261 |
| 3,254,336 | 5/1966 | Campbell | 340—384 |

FOREIGN PATENTS 418,182 10/1934 Great Britain.

RICHARD C. PINKHAM, *Primary Examiner.*

P. E. SHAPIRO, *Assistant Examiner.*

U.S. Cl. X.R.

273—29, 102.2; 340—261, 273, 384